(12) United States Patent
Nielsen et al.

(10) Patent No.: US 7,690,101 B2
(45) Date of Patent: Apr. 6, 2010

(54) APPARATUS FOR SEALING A FEEDTHROUGH ASSEMBLY

(75) Inventors: Christian S. Nielsen, River Falls, WI (US); Timothy T. Bomstad, Inver Grove Heights, MN (US)

(73) Assignee: Medtronic, Inc., Minneapolis, MN (US)

( * ) Notice: Subject to any disclaimer, the term of this patent is extended or adjusted under 35 U.S.C. 154(b) by 922 days.

(21) Appl. No.: 11/278,202

(22) Filed: Mar. 31, 2006

(65) Prior Publication Data

US 2007/0234557 A1 Oct. 11, 2007

(51) Int. Cl.
*B21D 37/10* (2006.01)
*H01R 43/04* (2006.01)

(52) U.S. Cl. .................. 29/751; 72/370.25; 72/416; 29/753; 29/517; 29/283.5

(58) Field of Classification Search .......... 29/748–758, 29/759–763, 278–282; 7/107; 140/117–118, 140/120; 269/203; 72/411–416, 370.12, 72/370.13, 370.25
See application file for complete search history.

(56) References Cited

U.S. PATENT DOCUMENTS

| 3,973,465 | A | | 8/1976 | Bachhuber et al. |
| 4,414,697 | A | * | 11/1983 | Hartley .......................... 7/107 |
| 4,856,186 | A | * | 8/1989 | Yeomans ..................... 29/863 |
| 4,964,200 | A | | 10/1990 | Giesbrecht et al. |
| 5,632,764 | A | * | 5/1997 | Beideman et al. ........... 606/205 |
| 5,906,175 | A | * | 5/1999 | Lowe .......................... 119/200 |
| 5,974,853 | A | * | 11/1999 | Strong et al. .................. 72/430 |
| 6,192,733 | B1 | * | 2/2001 | Long et al. .................... 72/430 |
| 6,801,424 | B1 | | 10/2004 | Nielsen et al. |
| 7,409,847 | B2 | * | 8/2008 | Wightman et al. ............ 72/416 |
| 2004/0260354 | A1 | | 12/2004 | Nielsen et al. |

* cited by examiner

*Primary Examiner*—Minh Trinh

(57) ABSTRACT

An apparatus is provided for forming a seal within a ferrule having a compression ring disposed therein. The apparatus comprises a frame assembly for crimping a portion of the ferrule, and a push rod assembly coupled to the frame assembly. The push rod assembly is capable of independent articulation with respect to the frame assembly and is configured to compress the compression ring within the ferrule.

11 Claims, 5 Drawing Sheets

US 7,690,101 B2

APPARATUS FOR SEALING A FEEDTHROUGH ASSEMBLY

TECHNICAL FIELD

This invention relates generally to an implantable medical device (IMD) and, more particularly, to an apparatus for forming a seal in a feedthrough assembly of an IMD.

BACKGROUND OF THE INVENTION

Feedthrough assemblies are employed in implantable medical devices (IMDs) for a variety of uses (e.g., to provide a pathway for one or more electrical leads through an IMD's container or through the casing of an electrochemical cell, such as a battery or capacitor). For example, feedthrough assemblies are commonly employed in IMD capacitors to guide an electrical lead through a capacitor's casing and electrically insulate the lead therefrom. Such a feedthrough assembly may comprise a metal ferrule (e.g., titanium) that is fixedly coupled (e.g., welded) to the capacitor's casing and an insulative structure disposed within the ferrule. The insulative structure secures and insulates the lead within the ferrule. The insulative structure also forms a hermetic seal within the ferrule, which may, in the case of a wet capacitor, help retain electrolytic fluids.

One known type of insulative structure comprises a compression seal stack including a polymeric compression ring (e.g., a silicon based material, nitrile, natural rubber, etc.) having an aperture therethrough for receiving the lead. The compression ring is threaded over the lead and positioned within a ferrule between two rigid insulating members (e.g., chromium doped alumina). The compression seal stack is then compressed causing the compression ring to expand radially between the insulating members and sealingly engage the outer surface of the terminal lead and the inner surface of the ferrule. A hermetic seal is thus formed within the ferrule. The seal stack may then be secured in its compressed state by crimping an end portion of the ferrule in the manner described below.

A compression and crimping apparatus may be utilized to compress the compression seal stack and crimp the ferrule of a feedthrough assembly. One such apparatus comprises two compression jaws that travel along a longitudinal track in a clamp-like manner. Both of the compression jaws include an opening (e.g., a slot) therein for receiving a segment of the lead, and each is configured to engage an opposite end of the ferrule. The jaw engaging the ferrule opposite the crimping portion may simply comprise a generally flat surface that acts as a support during crimping. In contrast, the compression jaw engaging the crimpable end portion of the ferrule comprises a well having an inclined surface and an island protruding upward from a central portion of the well. When the jaws are moved toward one another, the island forces the second insulating member further into the ferrule thereby compressing the compression ring and forming a hermetic seal within the ferrule. Additionally, the inclined surface of the well contacts and crimps the end portion of the ferrule to secure the seal stack in its compressed state and thus maintain the hermetic seal within the ferrule.

Compression and crimping devices of the type described above have certain limitations. For example, such devices do not permit the independent articulation of the crimping component (i.e., the inclined surface of the well) and the seal-forming component (i.e., the island). Thus, known devices are unable to adjust the seal-forming load independent of the crimping-load to, for example, accommodate for dimensional variations in the components of the compression seal stack. This, in turn, restricts the tolerance to which the components of the compression seal stack may be manufactured and decreases product yield. In addition, the crimping component in known devices may not be individually replaced with wear caused by repetitive crimping or interchanged with other components adapted to crimp different ferrule types.

Considering the above, it should be appreciated that it would be desirable to provide a compression and crimping apparatus that permits the independent articulation of the crimping component and the seal-forming component. It should also be appreciated that it would desirable for such an apparatus to permit the replacement and customization of the crimping component. Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The following drawings are illustrative of particular embodiments of the invention and therefore do not limit the scope of the invention, but are presented to assist in providing a proper understanding. The drawings are not to scale (unless so stated) and are intended for use in conjunction with the explanations in the following detailed descriptions. The present invention will hereinafter be described in conjunction with the appended drawings, wherein like reference numerals denote like elements, and.

DETAILED DESCRIPTION OF THE EXEMPLARY EMBODIMENT

The following description is exemplary in nature and is not intended to limit the scope, applicability, or configuration of the invention in any way. Rather, the following description provides a convenient illustration for implementing an exemplary embodiment of the invention. Various changes to the described embodiment may be made in the function and arrangement of the elements described herein without departing from the scope of the invention.

Figure 1:
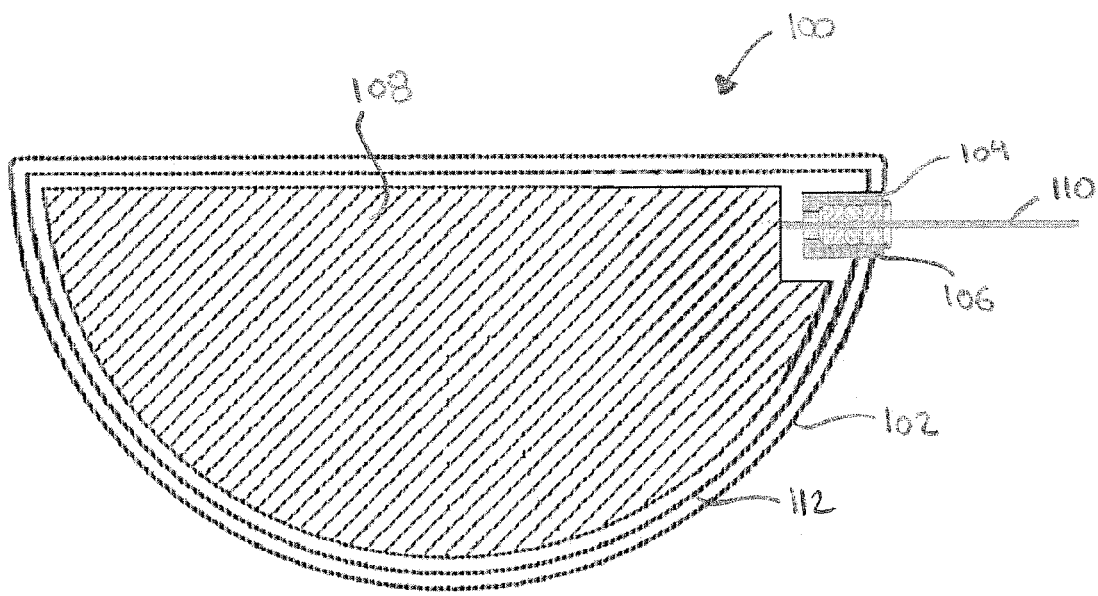
FIG. 1 is a side cross-sectional view of a flat electrolytic capacitor including a feedthrough assembly.

FIG. 1 is a side cross-sectional view of a known flat electrolytic capacitor 100 suitable for use in an implantable medical device. Capacitor 100 includes a D-shaped metal casing 102 (e.g., titanium) having an aperture 104 provided therethrough to accommodate a feedthrough assembly 106. A D-shaped anode 108 (e.g., tantalum) is disposed within casing 102 and has a first end of an anode lead 110 (e.g., tantalum) embedded therein. Lead 110 extends through feedthrough assembly 106 and may be coupled to, for example, an external lead having a plurality of electrodes thereon capable of delivering electrical shocks to stimulate a particular area or organ within a patient's body (e.g., the heart). An oxide film is formed on the surface of anode 108 by emersion in an electrolyte (e.g., water, phosphoric acid, and other organic solvents) and the application of a current, and layers of cathode material are deposited on the inside walls of casing 102. An insulative polymer separator material 112 (e.g., polypropylene) is provided between the cathode material and anode 108 to prevent shorting and to facilitate ionic conduction.

Figure 2:
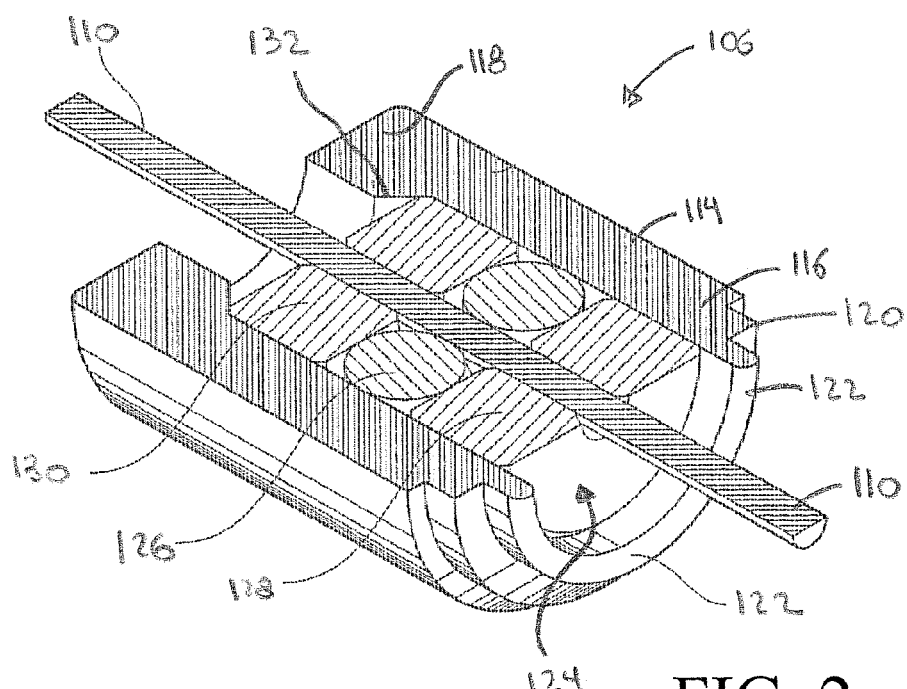
FIG. 2 is an isometric cross-sectional view of the feedthrough assembly shown in FIG. 1.

Referring now to FIG. 2, feedthrough assembly 106 comprises a ferrule 114 (e.g., titanium) having a first end region 116 and a second end region 118. End region 116 includes an outer stepped portion 120 that may be fixedly coupled (e.g., welded) to casing 102 proximate aperture 104 as shown in FIG. 1. End region 116 also includes a crimping portion 122, which may be, for example, an annular collar. A generally cylindrical cavity extends through ferrule 114 from end region 116 to end region 118. A compression seal stack 124 is disposed within this cavity to guide lead 110 through ferrule 114 and to insulate lead 110 from ferrule 114 and casing 102 (FIG. 1). As will be appreciated by one skilled in the art, compression seal stack 124 may comprise a variety of components and configurations; however, in the illustrated embodiment, compression seal stack 124 comprises three components: (1) a compression ring 126, (2) a first insulating member 128, and (3) a second insulating member 130. Compression ring 126 and insulating members 128 and 130 each have a ring like geometry that includes a central aperture for receiving lead 110. Compression seal stack 124 is formed as insulating member 130, compression ring 126, and insulating member 128 are threaded over lead 110 in succession and inserted into ferrule 114 through end region 116. Compression seal stack 124 is prevented from exiting ferrule 114 through end region 118 by an inner step 132, which abuts insulating member 130 as shown in FIG. 2.

Insulating members 128 and 130 are made of a relatively rigid material (e.g., hard plastic, glass, porcelain, alumina, chromium doped alumina, etc.), and compression ring 126 is made of a relatively soft, compressible material (e.g., a silicon based material, rubber, polychloroprene, polysulphide, nitrile, etc.). When force is applied to insulating member 128 in the direction of insulating member 130, compression ring 126 is compressed and radially expands to contact an outer diameter of lead 110 and an inner surface of ferrule 114. This results in the formation of a hermetic seal within ferrule 114. Collar 122 may be subsequently crimped to secure compression seal stack 124 in its compressed state and maintain the integrity of the seal within ferrule 114 as described below.

Figure 3:
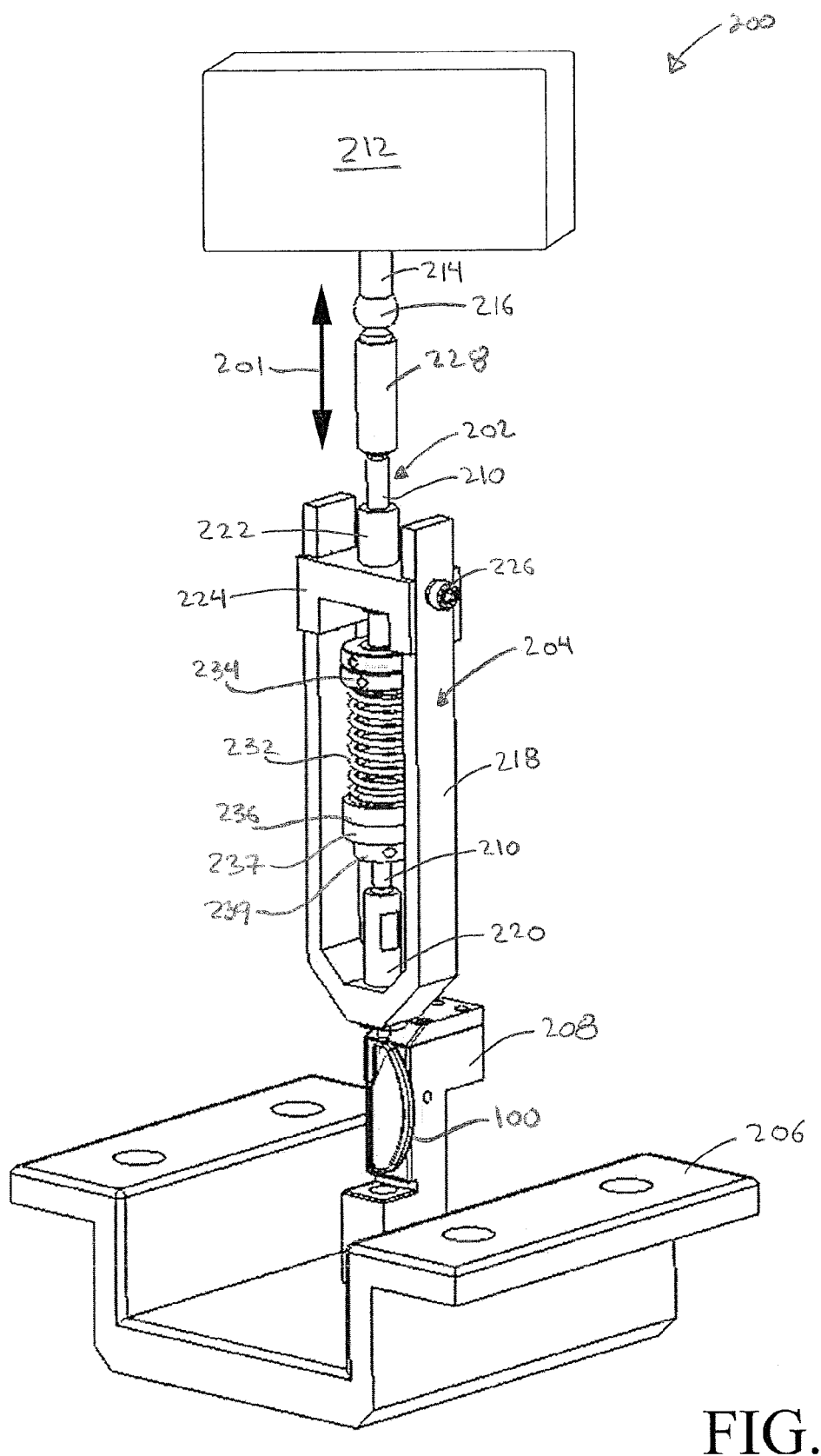
FIGS. 3 and 4 are isometric and cross-sectional views, respectively, of a compression and crimping apparatus in accordance with an exemplary embodiment of the present invention.
Figure 4:
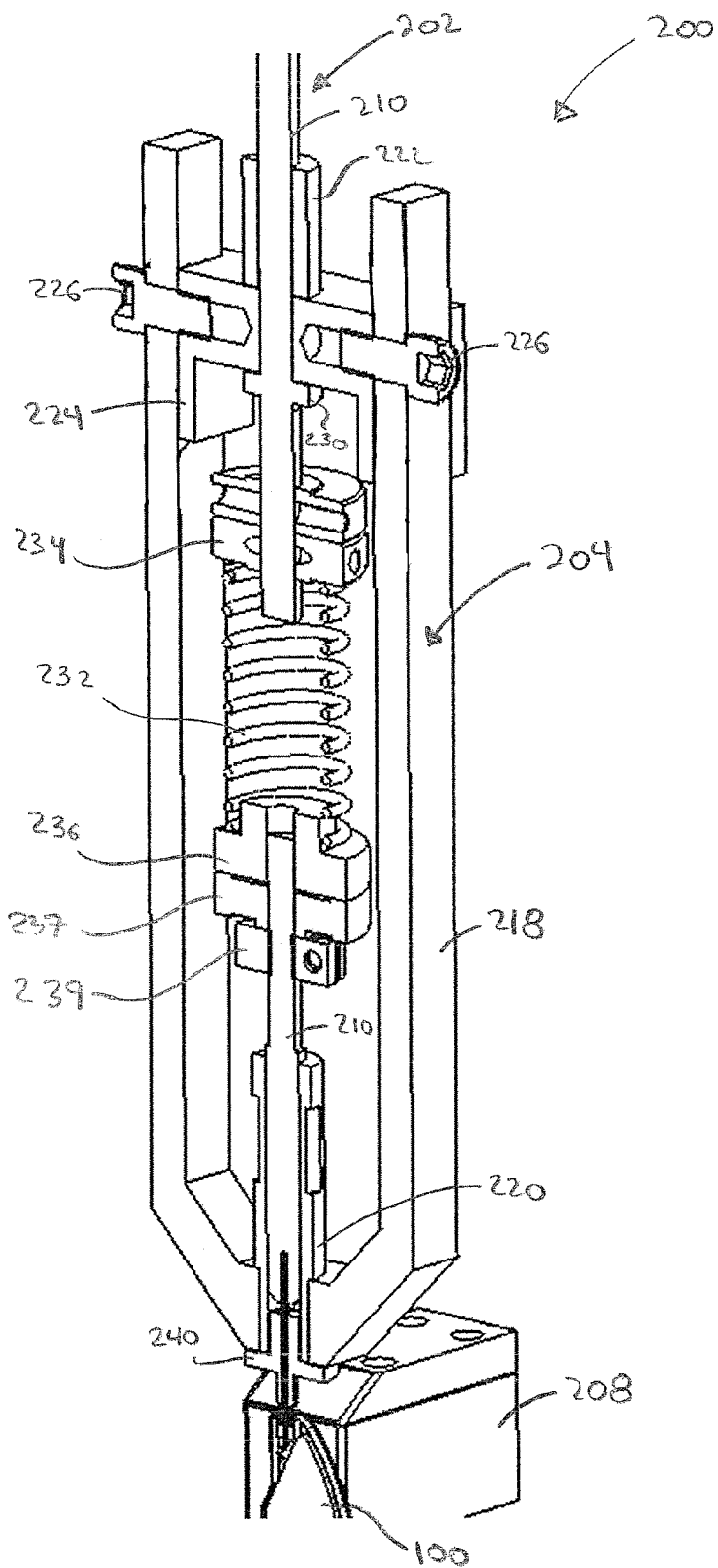

FIGS. 3 and 4 are isometric and cross-sectional views, respectively, of a compression and crimping apparatus 200 in accordance with an exemplary embodiment of the present invention. Apparatus 200 may be utilized to process feedthrough assembly 106 of capacitor 100; i.e., to form a compression seal within ferrule 114 and to crimp collar 122. Apparatus 200 comprises a push rod assembly 202, a press frame assembly 204, and a work bench 206 including a support 208 onto which capacitor 100 may be loaded. Push rod assembly 202 includes a push rod 210 that may translate between a retracted position and first and second extended positions (indicated in FIG. 3 by arrow 201). Push rod assembly 202 may be driven by, for example, a machine press 212. Machine press 212 is preferably a programmable servo press permitting the manipulation of various press characteristics, such as ram shaft displacement and press force. For example, press 212 may be a SCHMIDT Servo Press 4000 available from Schmidt Technology located in Cranberry, Pa. Machine press 212 includes a translatable shaft 214 to which push rod assembly 202 is coupled. Preferably, shaft 214 is coupled to push rod 210 by way of a flexible joint 216 (e.g., a ball and socket joint) as shown in FIG. 3. Joint 216 affords push rod assembly 202 and press frame assembly 204 lateral freedom thereby facilitating the loading of capacitor 100 onto support 208. Additionally, joint 216 promotes the concentric alignment of frame assembly 204 with feedthrough assembly 106 when the distal end of frame assembly 204 first contacts collar 122 in the manner described below.

Push rod assembly 202 and frame assembly 204 are coupled such that push rod assembly 202 is capable of independent articulation (i.e., translation movement) with respect to frame assembly 204. Press frame assembly 204 may comprise, for example, a frame 218 and one or more channeled bodies that help guide push rod assembly 202 within frame 218. In FIGS. 3 and 4, frame assembly is shown as comprising two such channeled bodies: (1) an alignment barrel 220 fixedly coupled to a distal portion of frame 218, and (2) a push rod slide stop 222 coupled to frame 218 via block 224. Push rod slide stop 222 may be fixedly coupled to block 224, which, in turn, may be removably coupled to a proximal portion of frame 218 via, for example, fasteners (e.g., bolts) 226.

Push rod 210 is provided with two structural features that may influence the movement of press frame assembly 204. First, as shown in FIG. 4, push rod 210 is provided with a banded region 230 having an increased outer diameter proximate block 224 of frame assembly 204. Banded region 230 abuts block 224 to support frame assembly 204 when push rod assembly 202 is in its retraced position. As push rod assembly 202, and thus banded region 230, moves downward, frame assembly 204 is no longer supported by region 230 and thus descends under the force of gravity until the distal tip of frame assembly 204 (i.e., the crimp tip) contacts ferrule 114. Secondly, as shown in FIG. 3, push rod 210 is provided with a segment 228 having an increased outer diameter proximate slide stop 222 of frame assembly 204. When push rod assembly 202 translates into the first extended position, segment 228 moves downward to abut slide stop 222. Next, as push rod assembly 202 descends further into the second extended position, segment 228 exerts a downward force on slide stop 222 thus pushing frame assembly 204 toward capacitor 100. This causes the distal tip of frame assembly 204, which is already in contact with ferrule 114, to move downward and crimp collar 122 of ferrule 114 as described in more detail below in conjunction with FIG. 8.

In a preferred embodiment, push rod assembly 202 is provided with a mechanism to adjust for variations in the dimensions (e.g., height) of compression seal stack 124 (FIG. 2). As shown in FIGS. 3 and 4, for example, push rod 210 may comprise two segments that are joined by an intermediate spring 232. The upper segment of rod 210 may be connected to spring 232 by way of an upper spring seat 234 that may comprise, for example, two counter-tightening nuts, which may be rotated with respect to one another to adjust the height of seat 234 and thus the pre-press load of push rod assembly 202. The lower segment of rod 210 may be connected to spring 232 by way of a lower spring seat 236, which may include a cylindrical protrusion (FIG. 4) extending upward into a lower portion of spring 232 to center spring 232 relative to assembly 202. In addition, a load cell 237 may be provided beneath lower spring seat 236 and coupled to the lower segment of rod 210 by way of, for example, a nut 239. As will be appreciated by one skilled in the art, load cell 237 may be coupled (e.g., via a wire) to a read-out (not shown) to relate the pre-compression load exerted on load cell 237 by lower spring seat 236 and, therefore, the load exerted on compression seal stack 124 by the distal tip of push rod assembly 202. Finally, if block 224 is removably coupled to frame 218 by way of fasteners 226 as suggested previously, removal of fasteners 226 and block 224 may permit spring 232 to be interchanged with other springs to accommodate compression seal stack of various types.

Figure 5:
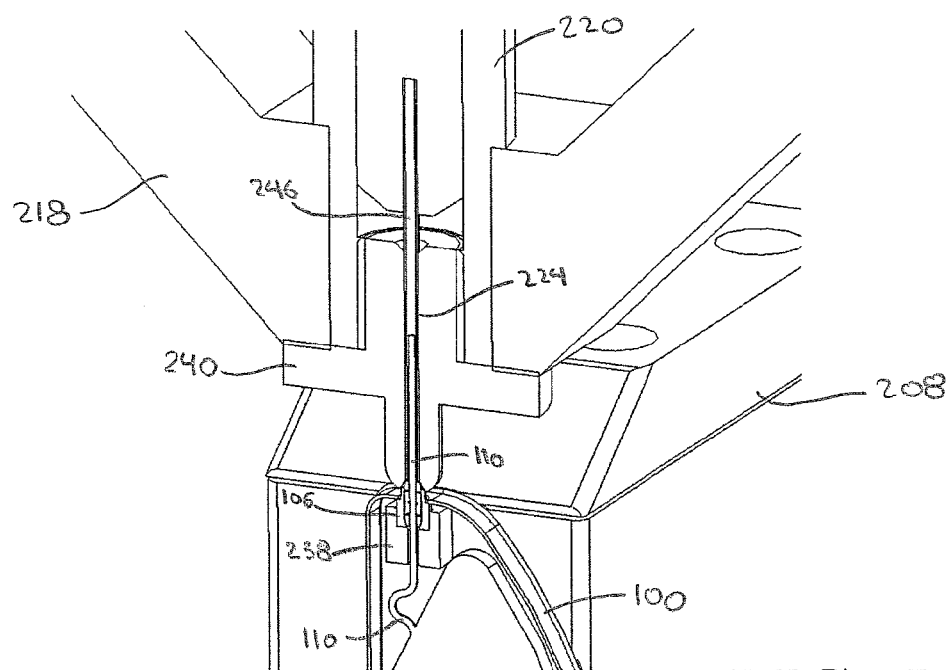
FIG. 5 is a cross-sectional view of the lower portion of the compression and crimping apparatus shown in FIGS. 3 and 4 and of a portion of the capacitor shown in FIG. 1.
Figure 6:
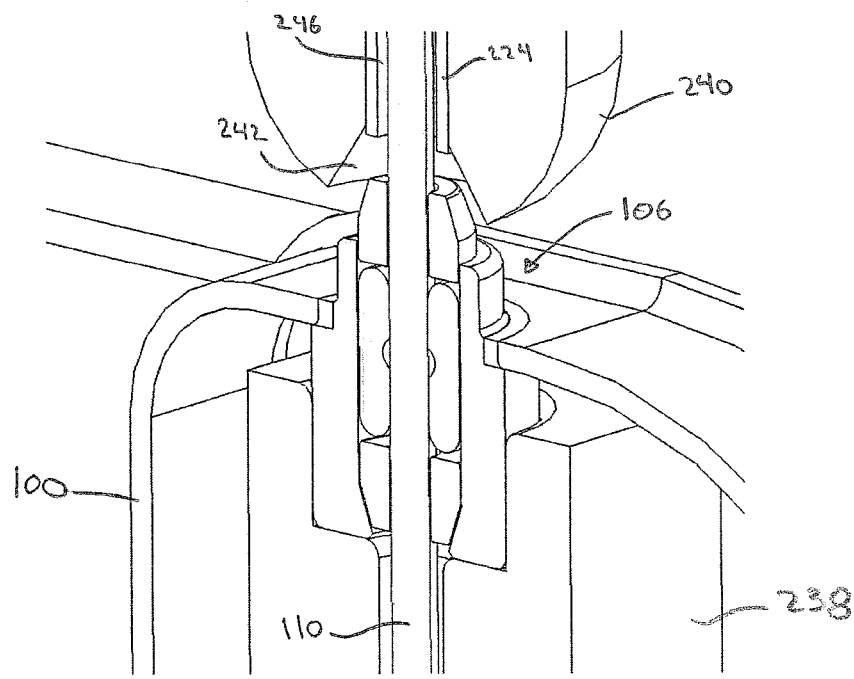
FIG. 6 is a cross-sectional view of the distal end of the crimping and compression apparatus shown in FIGS. 3-5 and of a portion of the feedthrough assembly shown in FIGS. 1 and 2.

FIGS. 5 and 6 are cross-sectional views showing the distal portions of push rod assembly 202 and press frame assembly 204 in greater detail. It can be seen that support 208 comprises a protruding anvil 238 having a cavity therein configured to receive a segment of lead 110 and the lower portion of ferrule 114. Anvil 238 supports feedthrough assembly 106 to secure capacitor 100 relative to push rod assembly 202 and frame assembly 204. As shown in FIGS. 4-6, the distal portion of frame assembly 204 may comprise a crimp tip 240 coupled to alignment barrel 220. Preferably, crimp tip 240 is interchangeably (e.g., threadably) coupled to frame assembly 204 to permit tip 240 to be replaced with wear and/or to permit substitution of tip 240 with various other crimp tips adapted for different applications or ferrule types. Crimp tip 240 includes a cavity (e.g., a concave depression) 242 in the distal tip thereof (most clearly shown in FIG. 6). Cavity 242 may have, for example, a unitary frustoconical profile. Alternatively, cavity 242 may have a profile comprising two conical regions each having a different general inclination. Cavity 242 is adapted to contact and crimp collar 122 as described below in conjunction with FIG. 8.

Push rod assembly 202 includes a tubular push rod tip 244 fixedly coupled to push rod 210 (FIG. 5). Push rod tip 244 extends from rod 210 through a channel provided through crimp tip 240 to emerge within cavity 242. Push rod tip 244 includes a longitudinal bore or channel 246 therein to accommodate lead 110 when capacitor 100 is loaded onto compression and crimping apparatus 200. As push rod tip 244 and/or as crimp tip 240 descends, lead 110 travels upward relative to channel 246. In this way, compression and crimping tool 200 ensures that a downward force will not be exerted lead 110 during the compression and crimping process.

Figure 7:
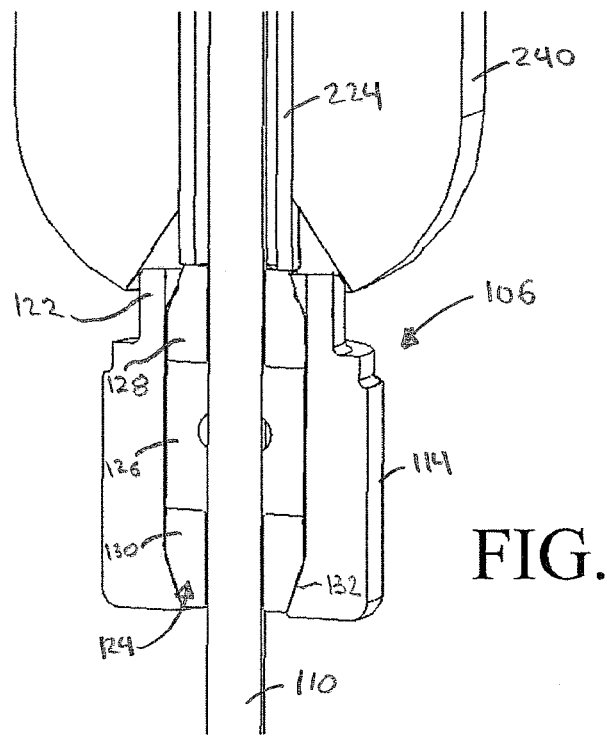
FIGS. 7 and 8 are cross-sectional views of the distal end of the apparatus shown in FIGS. 3-6 illustrating compression and crimping, respectively.
Figure 8:
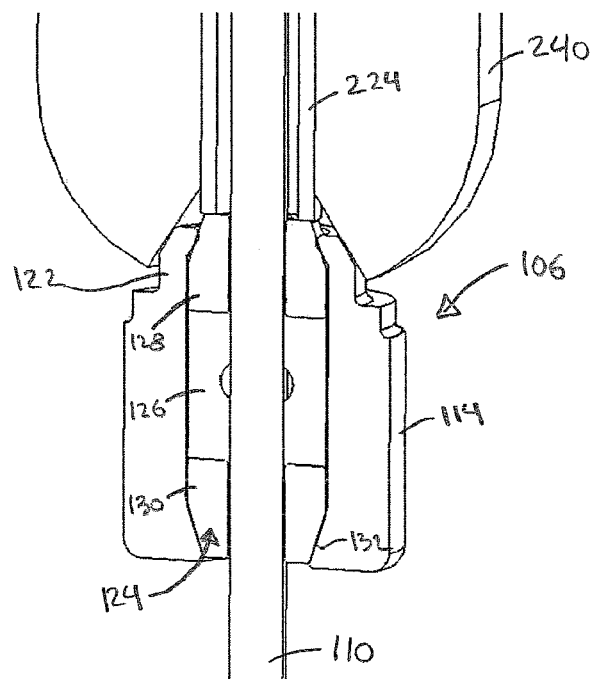

FIGS. 7 and 8 illustrate the manner in which compression and crimping tool 200 compresses seal stack 124 and crimps collar 122, respectively. Referring first to FIG. 7 in conjunction with FIGS. 3-6, compression seal stack 124 is compressed within ferrule 114 as press 212 extends push rod assembly 202 and push rod tip 244 downward. In particular, push rod tip 244 descends to contact insulating member 128 and force member 128 toward member 130. Compression ring 126 is thus compressed between insulating members 128 and 130. Consequently, ring 126 undergoes radial expansion and sealingly engages the outer surface of lead 110 and an inner surface of ferrule 114. Proper compression of seal stack 124 may be accomplished by programming press 212 to exert a pre-determined press load (e.g., 12 lbs.) on push rod assembly 202.

Referring now to FIG. 8 in conjunction with FIGS. 3-6, after a compression seal has been formed within ferrule 114 (FIG. 7), crimp tip 240 descends to crimp collar 122 in the following manner. First, press 212 causes push rod assembly 202 to descend and compress seal stack 124 within ferrule 114 in the manner described above. Next, frame assembly 204, which is no longer supported by banded region 230, moves downward under the force of gravity until the distal end of crimp tip 240 contacts ferrule 114. Crimp tip 240 and push rod assembly 202 remain at this position until segment 228 of push rod 210 contacts push rod slide stop 222 and forces push rod assembly 202 downward into its second extended position. This causes crimp tip 240 to contact collar 122 along the angled surface of cavity 242 thereby deforming collar 122 inward and crimping ferrule 114. In its crimped condition, collar 122 contacts insulating member 128 to maintain seal stack 124 in its compressed state and to preserve the hermetic seal within ferrule 114. The descent of push rod 202 may be controlled by a hard stop or, instead, by programming press 212 to exert a pre-determined press load (e.g., 200 lb-f.) as segment 228 of push rod 210 contacts slide stop 222. After collar 122 has been suitably crimped, push rod assembly 202 and press frame assembly 204 are raised and the process may then be repeated.

The inventive compression and crimping apparatus was described above in conjunction with a feedthrough assembly suited for a particular use (i.e., to provide a conductive path through the casing of a capacitor); however, it should be clearly understood that the compression and crimping apparatus may be used to form a compression seal within and/or crimp any feedthrough assembly irregardless of the way in which that assembly is to be utilized. Similarly, it should be appreciated that the term "feedthrough assembly" is used herein in its broadest sense and includes any assembly comprising a ferrule with a conduit (e.g., an electrical lead, a tubular pathway, etc.) passing therethrough.

In view of the above, it should be appreciated that a compression and crimping apparatus has been provided that permits the independent articulation of the crimping component and the seal-forming component. In addition, it should be appreciated that a compression and crimping apparatus has been provided that permits the replacement and customization of the crimping component. Although the invention has been described with reference to a specific embodiment in the foregoing specification, it should be appreciated that various modifications and changes can be made without departing from the scope of the invention as set forth in the appended claims. Accordingly, the specification and figures should be regarded as illustrative rather than restrictive, and all such modifications are intended to be included within the scope of the present invention.

What is claimed is:

1. An apparatus for forming a seal within a ferrule having a compression ring disposed therein, comprising:
 a frame assembly for crimping a portion of the ferrule; and
 a push rod assembly coupled to said frame assembly and capable of independent articulation with respect thereto, said push rod assembly for compressing the compression ring within the ferrule, wherein a conduit passes through the ferrule and wherein said push rod assembly further comprises a push rod tip for compressing the compression ring within the ferrule, said push rod tip having a channel therein for receiving a portion of the conduit.

2. An apparatus according to claim 1 further comprising a press coupled to said push rod assembly.

3. An apparatus according to claim 1 wherein said frame assembly includes a channel therethrough for receiving said push rod tip.

4. An apparatus according to claim 1 wherein said frame assembly includes a frame and a crimp tip coupled to a distal portion of said frame for crimping an end region of the ferrule.

5. An apparatus according to claim 4 wherein said crimp tip is interchangeably coupled to said frame.

6. An apparatus according to claim 4 wherein said crimp tip includes a cavity in a distal portion thereof for engaging the ferrule.

7. An apparatus according to claim 1 wherein said frame assembly further comprises at least one channeled body for guiding said push rod assembly.

8. An apparatus according to claim 7 wherein said push rod assembly includes a segment having an outer diameter greater than the inner diameter of said channeled body, said segment configured to contact said channeled body to cause said frame assembly to crimp the ferrule.

9. An apparatus according to claim 1 wherein said push rod assembly comprises at least one push rod having a spring coupled thereto.

10. An apparatus according to claim 9 wherein said spring is coupled to said at least one push rod via a height-adjustable spring seat.

11. An apparatus for forming a seal within a ferrule having a compression ring disposed therein, comprising:
- a frame assembly for crimping a portion of the ferrule comprising at least one push rod having a spring coupled thereto and at least one channeled body for guiding said push rod assembly; and
- a push rod assembly coupled to said frame assembly and capable of independent articulation with respect thereto, said push rod assembly for compressing the compression ring within the ferrule and including a segment having an outer diameter greater than the inner diameter of said channeled body, said segment configured to contact said channeled body to cause said frame assembly to crimp the ferrule.

* * * * *